(12) United States Patent
Prepon

(10) Patent No.: US 11,019,964 B1
(45) Date of Patent: Jun. 1, 2021

(54) FOOD PREPARATION SYSTEM

(71) Applicant: Prep On LLC, Brooklyn, NY (US)

(72) Inventor: Laura Prepon, Brooklyn, NY (US)

(73) Assignee: PREP ON LLC, Brooklyn, NY (US)

( * ) Notice: Subject to any disclaimer, the term of this patent is extended or adjusted under 35 U.S.C. 154(b) by 0 days.

(21) Appl. No.: 17/190,170

(22) Filed: Mar. 2, 2021

(51) Int. Cl.
*A47J 47/00* (2006.01)
*B65F 1/14* (2006.01)

(52) U.S. Cl.
CPC ........... *A47J 47/005* (2013.01); *B65F 1/1415* (2013.01)

(58) Field of Classification Search
CPC .......... A47J 47/00; A47J 47/005; A47J 47/02; A47J 47/06; B25B 11/00; B25B 11/02
See application file for complete search history.

(56) References Cited

U.S. PATENT DOCUMENTS

| | | | |
|---|---|---|---|
| 3,998,415 A | 12/1976 | D'Antonio et al. | |
| 5,386,978 A * | 2/1995 | Ladwig | A47J 47/005 269/289 R |
| D616,700 S * | 6/2010 | Pourounidis | D7/388 |
| 8,262,070 B2 * | 9/2012 | Liu | B60R 11/0258 269/254 R |
| 9,049,964 B2 | 6/2015 | Baranoff | |
| 2004/0182288 A1 | 9/2004 | Goldberg et al. | |
| 2006/0012097 A1 * | 1/2006 | Wernette | A47J 47/005 269/289 R |

* cited by examiner

*Primary Examiner* — Lee D Wilson
(74) *Attorney, Agent, or Firm* — Timothy Bechen; Bechen PLLC

(57) ABSTRACT

An improved food preparation system includes a base with a top portion, side portion and bottom portion. Attached to the side portion is an arm assembly, which in one embodiment includes a first and second arm. The base includes a channel, the arm assembly connected thereto and slidable therein. Based on sliding within the channel, the arm assembly is adjustable between a storage position and an open position. The system includes a hinging element connecting the arm assembly to the base and a locking mechanism locking the arm assembly in the extended position. While in the extended position, the dual-arm assembly can transition between an engaged position and a disengaged position. While in the extended position, a bag is held open by the arms of the arm assembly for receiving food scraps. During non-use, the bag is removed, the arm assembly is returned to the closed position.

19 Claims, 5 Drawing Sheets

FOOD PREPARATION SYSTEM

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

RELATED APPLICATIONS

There are no related applications.

FIELD OF INVENTION

The disclosed technology relates generally to a food preparation station and more specifically to a cutting board with an attachment assembly for collecting food scraps.

BACKGROUND

There are many known solutions for collecting food scraps leftover from food preparation. During food preparation, the user is typically focused on ease of use and efficiency, therefore collection and disposal of food waste cannot be overly complicated or interfere with the underlying task. Another problem is the amount of available space for food prep and storage during non-use.

One existing solution is U.S. Pat. No. 5,386,978, which includes a hinge in the middle of the cutting board. The user can push food items into the hinge and then dump the food into a pan or bowl. This solution can also work with food scraps, requiring the user to walk the cutting board over to a garbage bin.

U.S. Pat. No. 9,049,964 is another solution for separating food from food waste. This solution uses an elevated cutting board with insertable discs. The user can slide food across the disc to cut the food. The food falls into a collection bin and the user must then manually dispose of the food waste.

U.S. Publication No. 2004/0182288 describes an elevated station with various design elements to assist in food preparation. The elevated station has footings that fits over a wastebasket. The cutting board includes apertures for pushing the food scraps directly into the waste basket.

Another solution is U.S. Publication No. 2006/0012907 also disclosing an elevated food preparation station. This solution includes two options for collecting food scraps, a bin that slides under the frame and/or a bag attached to the frame. Food scraps can be slid off the cutting surface into the bin or slid off the back of the cutting surface into the bag. This prior art solution relies on a complex frame structure, which takes up a large amount of space, both during use and storage.

Where U.S. Publication No. 2006/0012907 notes a bag connected to arms, it fails to denote how the bag is held in place. U.S. Pat. No. 3,998,415 describes a technique for holding a bag open. This technique requires securing means, such as clothes pins and screw boards to hold the bag within the curvilinear shape.

The prior art cutting board solutions fail to accommodate space requirements. As such, there is a need for collecting food waste with a food preparation system providing ease of use with efficient space utilization.

BRIEF DESCRIPTION

An improved food preparation system, overcoming the prior art limitations, is described herein. The food preparation system includes a base with a top portion having a preparation surface for cutting foodstuffs thereon. The base also includes a side portion.

Attached to the side portion is an arm assembly. In one embodiment, the arm assembly includes just a single arm, also referred to as a first arm. Whereas, in further embodiments, the arm assembly includes a first arm and a second arm. The arm assembly is adjustable between an engaged position and a disengaged position. In the engaged position, the first arm is aligned and in contact with the second arm. In the disengaged position, the first arm is separated from the second arm.

A channel is disposed within the side portion of the base, the arm assembly is connected to the base within the channel. The arm assembly is slidable within the channel. Based thereon, the arm assembly can be in a storage position in near engagement with the side portion and in an extended position extending outward from the top portion of the base.

The food preparation system additionally includes a locking mechanism for securing the arm assembly in the extended position. In one embodiment, the locking mechanism can be a notch within the side portion of the base.

Herein, the arm assembly can be placed in the extended position, above the base. From there, the arm assembly is adjusted from the disengaged position to the engaged position for securing a bag between the first arm and the second arm. The bag additionally engages a bottom portion of the base, causing the bag to be held in an open position. As it is held in this open position, the bag can receive food scraps from the cutting of foodstuffs on the preparation surface.

The food preparation system may further include at least one hinging element connecting the arm assembly to the base such that the arm assembly, when moving to the extended position includes rotation about the hinging element. Additionally, when the first arm and the second arm are separated when moving into the disengaged position, the first arm and/or the second arm rotate about the hinging element.

The channel in the food preparation system may additionally include an interior track and an exterior track. The hinging element can include a first portion secured within the interior track and a second portion secured within the exterior track. The interior track and the exterior track can provide guidance for sliding the arm assembly within the channel.

In one embodiment, the first arm can have a handle. The handle allows for changing the arm assembly between the storage and extended positions, as well as assisting in changing the arm assembly between the engaged and disengaged positions.

In one embodiment, the second arm includes a tab portion extending outwards and fitting within the handle of the first arm when the arm assembly is in the engagement position. In the embodiment with a single arm, the single arm can transition between the storage position and the extended position for displacement away from the top portion. Whereby the single arm embodiment may use varying techniques for engaging the bag to collect food scraps.

Herein, the food preparation system facilitates placement of a bag in the arm assembly extending outward from the base. Cutting food on the base, food scraps are readily pushed into the bag held in the open position by the arm assembly. Upon completion of food preparation, the arm assembly can be returned to a storage position for space-saving storage.

A better understanding of the disclosed technology will be obtained from the following detailed description of the preferred embodiments taken in conjunction with the drawings and the attached claims.

DETAILED DESCRIPTION

Figure 1:
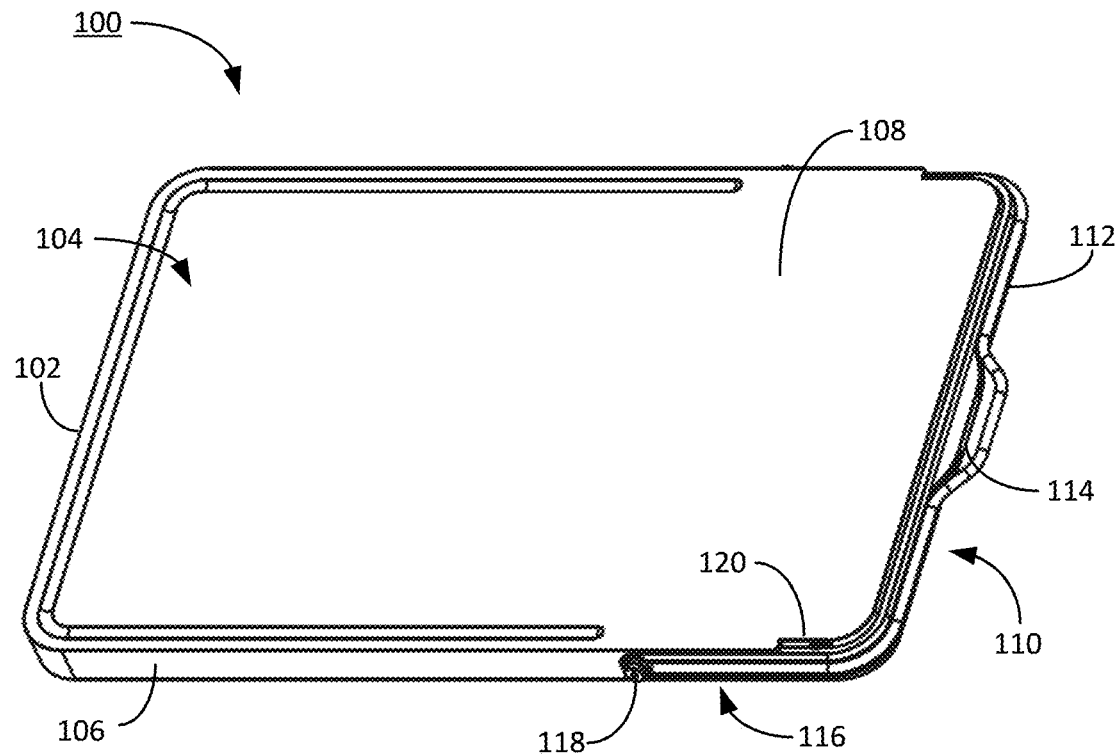
FIG. 1 illustrates a perspective view of the food preparation system as a regular cutting board with the arm assembly in a storage position.

FIG. 1 illustrates one embodiment of a food preparation system 100. The system 100 includes a base 102 having a top portion 104, a side portion 106 and a bottom portion (not visible).

The top portion 104 includes a food preparation surface 108. The food preparation surface 108 may include a specific surface or coating for facilitating chopping of foodstuffs. In this embodiment, the system 100 is usable as a standard cutting board, allowing a user to chop food items on the prep surface. Additionally, the system 100 in this embodiment is readily storable similar to a standard cutting board.

The food preparation system 100 further includes an arm assembly 110 including a first arm 112 and a second arm 114. As described in greater detail below, the arm assembly 110 transitions between a storage position (as visible in FIG. 1) and an extended position. The arm assembly 110 also transitions between an engaged position, with the first arm engaged with the second arm, and a disengaged position, with the first arm separated from the second arm.

The food preparation system 100 further includes a channel 116 disposed on the side portion 106 of the base 102. The system 100 additionally includes a hinge element 118 that secures the arm assembly 110 to the base 102 and within the channel 116. As described in greater detail below, the channel 116 and the hinge element 118 allow the arm assembly 110 to transition between the storage position and the extended position. The storage position, visible in FIG. 1, is where the arm assembly 110 is affixed against the side portion 106 and the extended position is where the arm assembly extends outward from the base member, such as illustrated in FIGS. 7-10.

Further illustrated in FIG. 1, the system 100 includes one embodiment of a locking mechanism 120. In this embodiment, the locking mechanism 120 is a notched groove in the transition between the side portion 106 and the top portion 104. When the arm assembly 110 transitions to the extended position, the arm assembly 110 can be held, e.g. locked, in place by the locking mechanism 120. As used herein, the term locked and locking mechanism refers to the securing and holding in place of the arm assembly in the extended position, in this embodiment using a snap-fit or tension engagement. Any further embodiment securing or holding the arm assembly in place as recognized by one skilled in the art are within the scope of the term locked and the locking mechanism as used herein.

The food preparation system 100 improves collecting of food scraps but also provides a compact system for storage during non-use. During storage, the arm assembly 110 being in the storage position allows for a compact system 100 similar in size to a standard cutting board.

In one embodiment, the base 102 can be made of a plastic or similar material. Whereby, the base 102 can also be composed of additional materials, such as bamboo or other type(s) of wood. Additionally, the base 102 can be composed of multiple materials combined for providing an appropriate surface for the food preparation surface 108 as well as facilitating the arm assembly 110 and channel(s) 116 noted herein.

When the arm assembly 110 is in the extended position, the first arm 112 and the second arm 114 are moveable for securing a disposal bag about the end of the preparation surface 108. During food preparation, food scraps can then be efficiently pushed from the preparation surface 108 into the bag being held open by the arm assembly and the bottom portion of the base 102.

As noted herein, one embodiment includes the arm assembly 110 with first arm 112 and the second arm 114. A further embodiment includes the arm assembly 110 having a single arm in lieu of the first arm 112 and the second arm 114. In varying embodiments, the single arm can be first arm 112 without the second arm 114, the second arm 114 without the first arm 112, a fused combination of the first arm 112 and the second arm 114, or any other suitable arm assembly consisting of a single arm unit that operates in accordance with functions described herein. As described below, the single arm embodiment operates consistent with the embodiment using the first arm 112 and the second arm 114, but excludes the engaged position and disengaged positions for inserting a bag therebetween. Whereby, the term single arm can be the same as a first arm, referring to the arm assembly having a single or first arm, and not necessarily meaning the single arm must be the same as the first arm 112 of FIG. 1.

Figure 2:
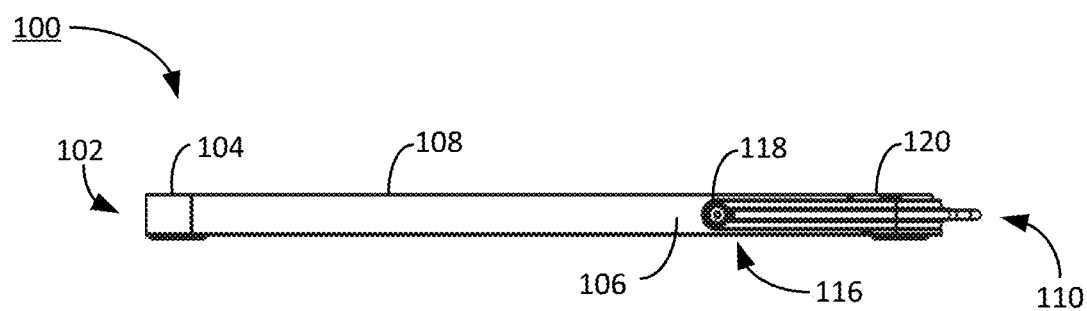
FIG. 2 illustrates a side view of FIG. 1.

FIG. 2 illustrates a side view of the system 100 of FIG. 1. The base 102 includes the top portion 104 with a food preparation surface 108. The side portion 106 includes the channel 116 with the arm assembly 110 disposed therein. The hinging element 118 is within the channel 116. The locking mechanism 120 is also visible in the transition between the side portion 106 and the top portion 104.

Figure 3:
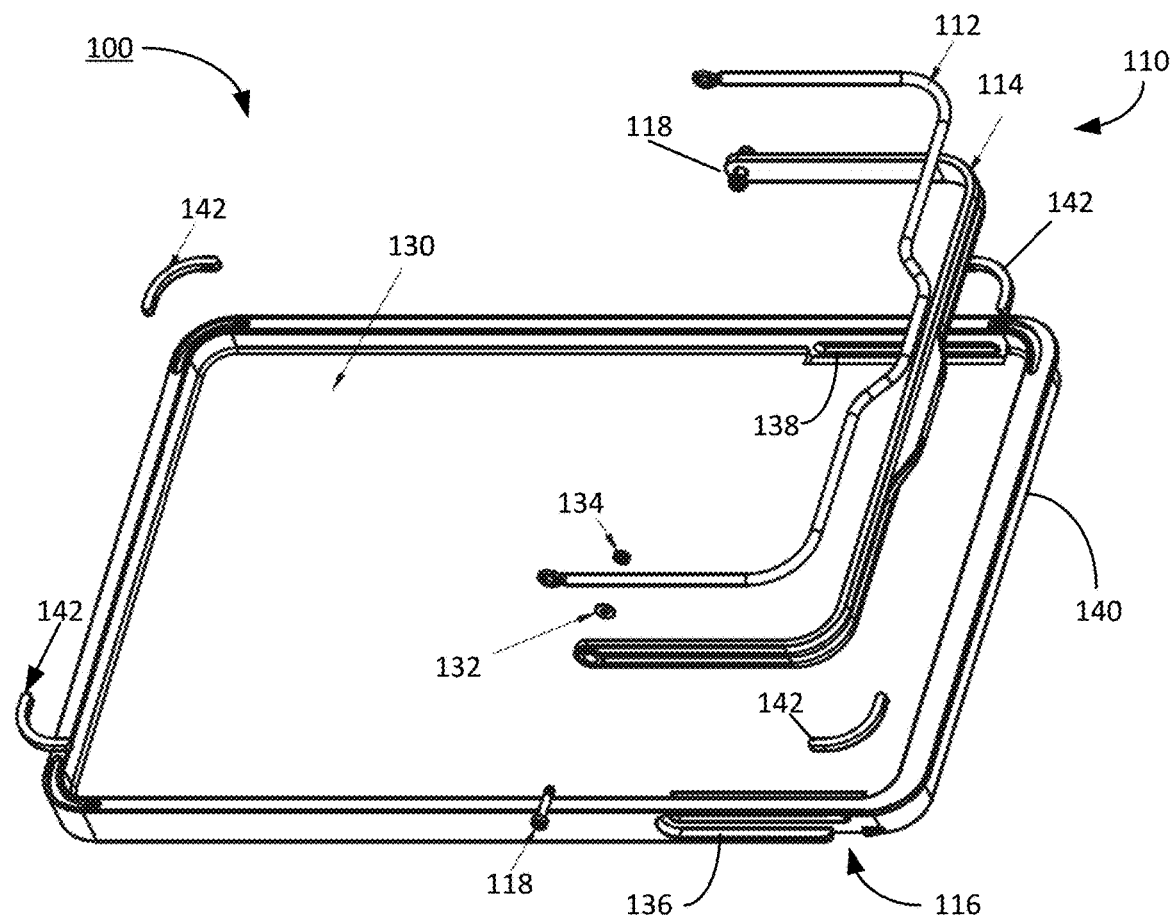
FIG. 3 illustrates an exploded view of one embodiment of the food preparation system.

FIG. 3 illustrates an exploded underside view of the food preparation system 100. The bottom portion 130 is visible as the underside of the base 102. The arm assembly 110 is also illustrated in an exploded view with the first arm 112 and the second arm 114.

The exploded view illustrates one embodiment of the hinging element 118. In this embodiment, the hinging element 118 is a threaded bolt with a washer 132 and nut 134. The first arm 112 and the second arm 114 include apertures at arm endpoints. Here, the hinging element 118 is threaded through the apertures and through the channel 116, securing the arm assembly 110 to the base 102.

Also visible, the channel 116 includes an exterior track 136 and an interior track 138. In one embodiment, when assembled with the arm assembly 110, the hinging element 118 is disposed on the exterior track 136 with the washer 134 and nut 136 disposed in the interior track 138. The engagement of the arm assembly 110 to the channel 116 can use any suitable connecting means as recognizing by one skilled in the arm, whereby the hinging element 118 with washer 134 and nut 136 is not expressly limiting in scope. By way of example, the arm assembly 110 can be snug-fit or snapped-fitted into an aperture within the channel 116 allowing the arm assembly to rotate and engage the locking mechanism. Further embodiments may include magnets, adhesive to hold the hinging element in place, fusing plastic elements to hold them arm assembly slidable within the channel, manufacturing the arm assembly within the channel, or any other suitable embodiment as recognized by one skilled in the art.

Illustrated in FIG. 3, the channel 116 extends for a distance within the side portion 106. The hinging element 118, securing the arm assembly 110 to the base 102, is slidable within the channel 116. As the hinging element 118 slides, the arm assembly 110 transitions from a storage position, such as visible in FIG. 1, to an extended position. As the arm assembly 110 slides within the channel 116, the hinging element 118 engaging the washer 132 and nut 134 ensures the arm assembly 110 stays within the channel 116 and connected to the base 102.

The FIG. 3 illustration includes additional embodiments, such as an inset 140 into which the arm assembly 110 can rest when in the storage position. The bottom portion 130 may further include edge components 142 disposed at corners of the base 102. These components 142 can be rubberized material, including stickiness to inhibit unnecessary movement of the base 102 during use. Also visible in this embodiment, the bottom portion 130 can include a general cavity. This embodiment reduces material production requirements for a preparation system having a thickness that accommodates the side portion and channels noted herein. Additionally, the general cavity of the bottom portion 130 allows for assembly of the washer 132 and nut 134 to the hinging element 118 during construction.

Whereas it is understood the general cavity is not an explicit requirement and further embodiments of the food preparation system may include a solid bottom portion 130. Moreover, the inclusion of the washer 132 and nut 134 to the threaded bolt hinging element 118 is one illustrated embodiment. The hinging element 118 may be any suitable connecting mechanism securing the arm assembly 110 within the channel 116 and allowing for hinging thereon, as recognized by one skilled in the art.

Figure 4:
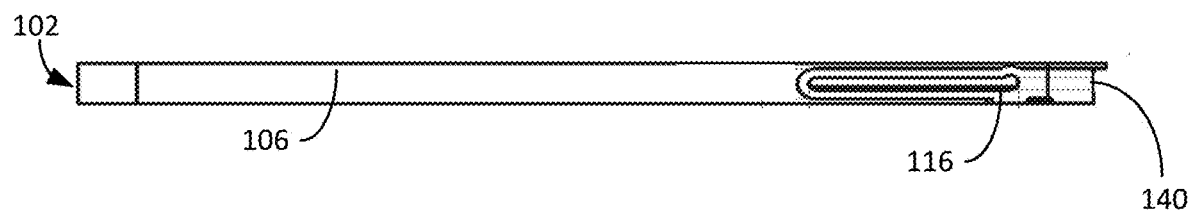
FIG. 4 illustrates a side view of base without the arm assembly.

FIG. 4 illustrates a side view of the base 102 of FIG. 3 without the arm assembly visible. The FIG. 4 illustration shows the channel 116 disposed on the side portion 106. Also visible is the inset 140 where the arm assembly can be positioned in its storage position.

Figure 5:
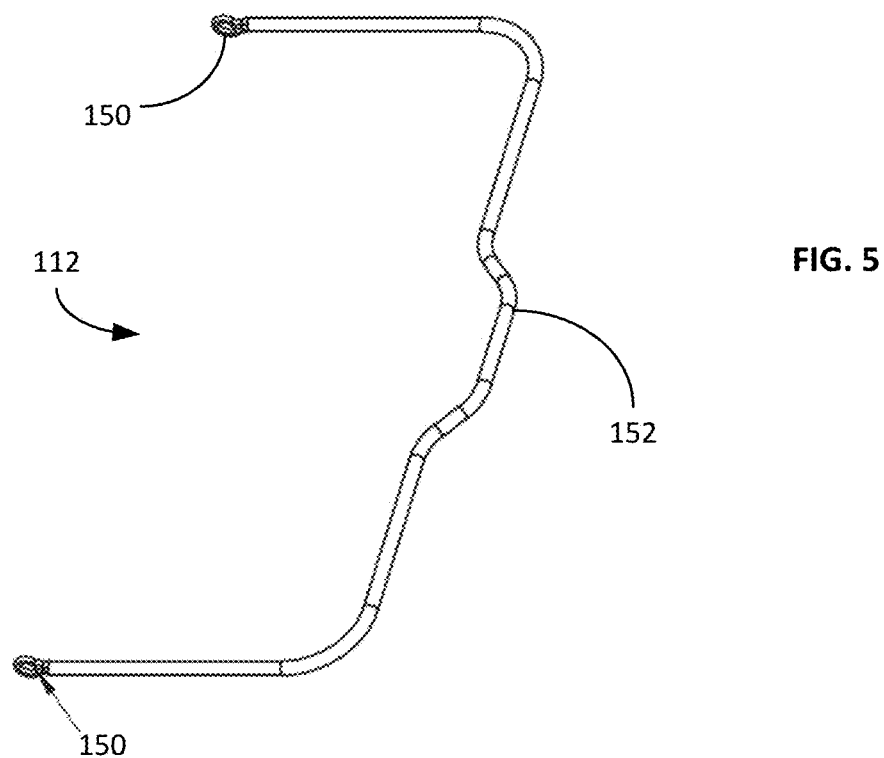
FIG. 5 illustrates one embodiment of a first arm of the arm assembly.

FIG. 5 illustrates one embodiment of the first arm 112. In this embodiment, the first arm 112 is composed of a metal, such as a stainless steel or similar material. The metal composition provides structure and rigidity.

The first arm 112 includes apertures 150 at opposing ends. As described above, the hinging element can be inserted through apertures 150 to secure the first arm 112 to the base.

The first arm 112, in this embodiment, includes a handle 152 formed by a curvature. As discussed below, this handle 152 allows for transitioning the arm assembly between storage and extended position, as well as for disengaging and engaging the second arm.

In this embodiment, the shape of the arm 112 generally matches the shape of the base (102 of FIG. 1). The shape in this embodiment allows for ease of storage when in storage position. It is recognized that the shape of the arm 112 is not expressly limited to mirroring the base or the shape illustrated herein.

Figure 6:
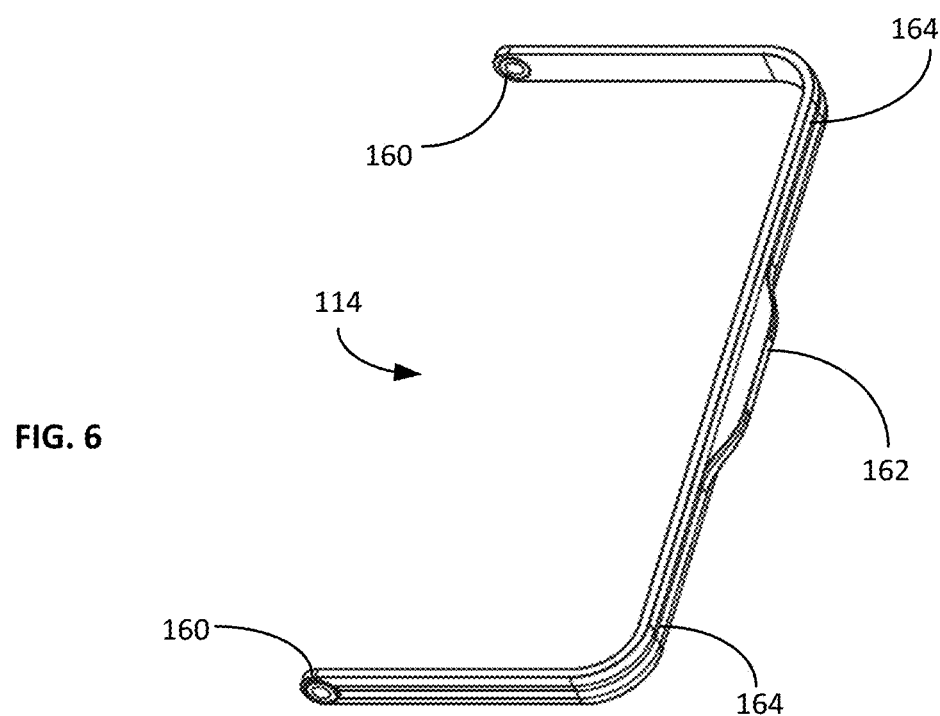
FIG. 6 illustrates one embodiment of a second arm of the arm assembly.

FIG. 6 illustrates one embodiment of the second arm 114. In this embodiment, the second arm 114 is composed of a hard plastic or similar material. The plastic composition provides structure and rigidity as well as a shape allowing for benefits noted herein.

The second arm 114 includes apertures 160 at opposing ends. Similar to the first arm, these apertures 160 allow the hinging element to be inserted therethrough. This secures the second arm 114, along with the first arm, to the base.

The second arm 114 further includes, in this embodiment, a handle 162. This handle 162 allows for transitioning the arm assembly between storage and extended position, as well as for disengaging and engaging the first arm. In this embodiment, the handle 162 includes a flange that extends outward. Moreover, in this embodiment the handle 162 can fit within the first arm handle (152 of FIG. 5).

In one embodiment, the second arm 114 can further include a central channel 164 running across its exterior. Whereby, when mated, the first arm can snug fit within the channel 164 to be held in place.

In this embodiment, the shape of the arm 114 generally matches the shape of the base (102 of FIG. 1). The shape in this embodiment allows for ease of storage when in storage position. It is recognized that the shape of the arm 114 is not expressly limited to mirroring the base or the shape illustrated herein.

Figure 7:
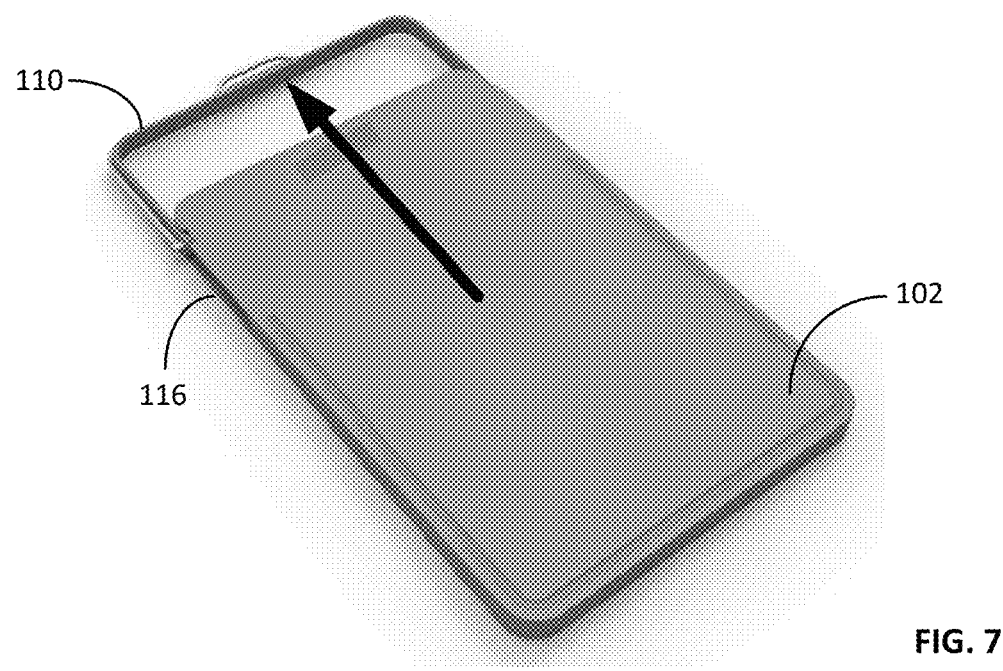
FIGS. 7-8 illustrate the arm assembly of the food preparation system transitioning from a storage position to an extended position.

FIGS. 7-10 illustrate the transitions of the food preparation system. FIG. 7 illustrates the base 102 with the arm assembly 110 transitioning from the storage position to the extended position. This transition occurs by the arm assembly 110 sliding within the channel 116 outward from the base 102.

Figure 8:
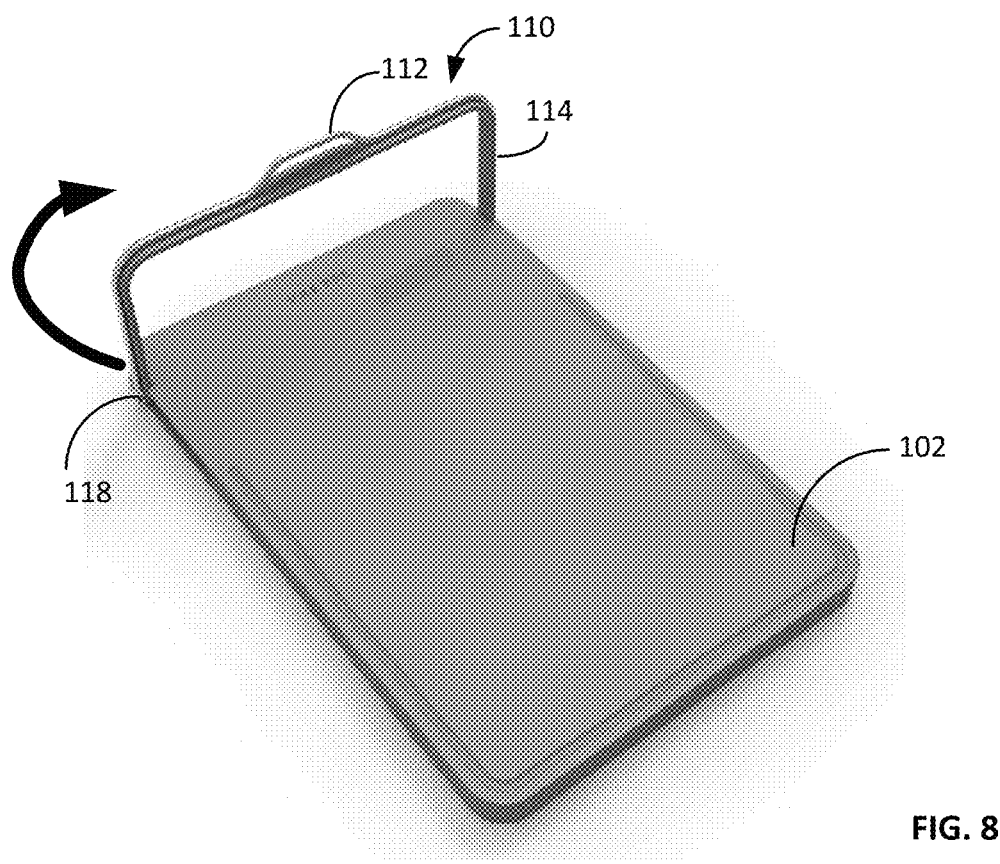

FIG. 8 illustrates a next transition towards the extended position of the arm assembly 110. The arm assembly 110 is rotated about the hinging element 118, extending upwards over the base 102. In one embodiment, the arm assembly 110 can be rotated to approximately 90 degrees from the base 102.

In this transition to the open position, the arm assembly 110 is secured in the extended position via the locking mechanism 120. In this embodiment, the locking mechanism 120 is the notch in the base 102. As the arm assembly 110 rotates, the second arm 114 snaps into the notch 118. The arm assembly 110 is then held in place in this extended position.

Figure 9:
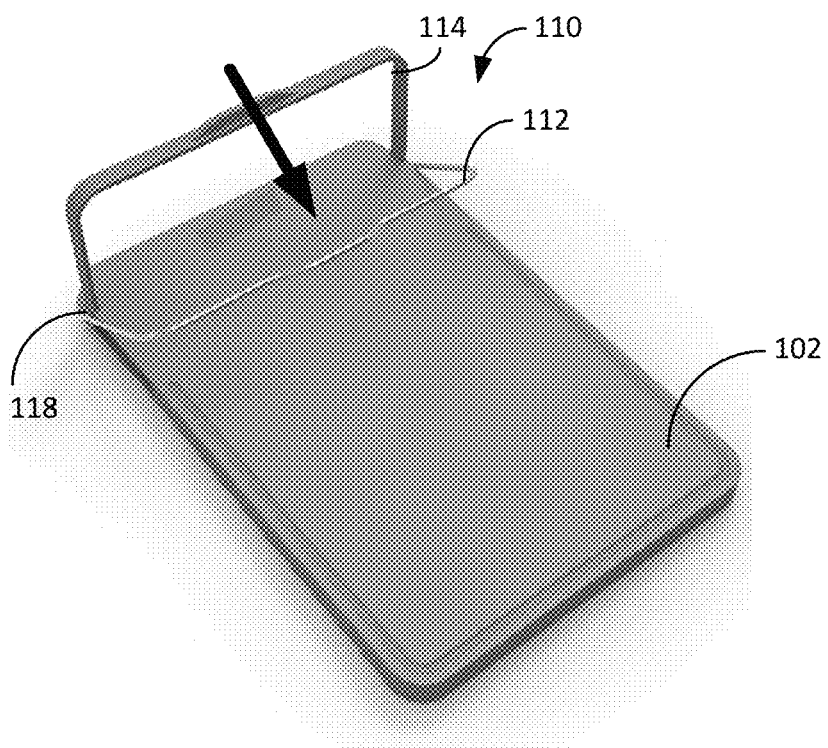
FIG. 9 illustrates the arm assembly in a disengaged position.

FIG. 9 illustrates the transition of the arm assembly 110 between its engaged position and disengaged position. The arm assembly 110 is in the engaged position in FIGS. 7-8, with the first arm 112 and the second arm 114 engaged together. Now, as illustrated in FIG. 9, the first arm 112 is separated from the second arm 114, illustrating the disengaged position. The first arm 112 further rotates about the hinging element 118, extending further forward over the base 102.

While the arm assembly 110 is in the disengaged position, a user can then insert a bag between the arms 112, 114. The side and top portion of the bag opening can be pulled through the first arm 112 and the second arm 114 when the arm assembly is in the disengaged position. An opening of the bag can be secured under the bottom portion of the base and extending up through the opening between the arms 114 and 112 of FIG. 9.

Figure 10:
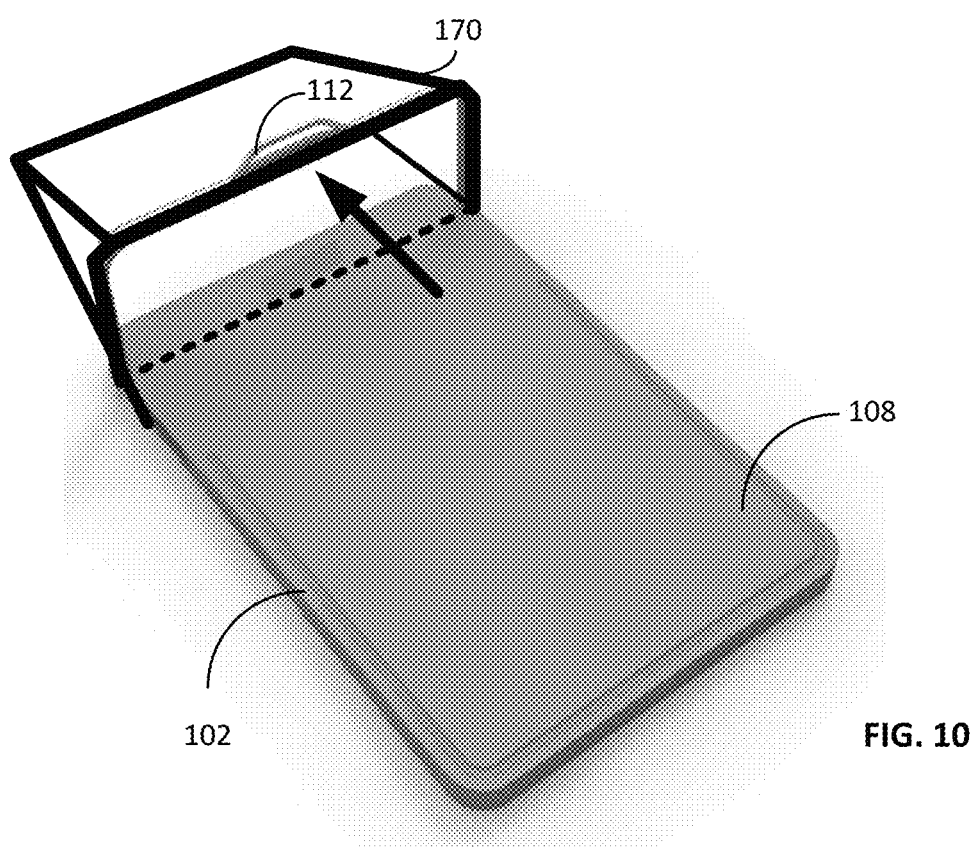
FIG. 10 illustrates the arm assembly in an engaged position with a bag secured therein.

FIG. 10 illustrates the bag 170 secured in place by the movement of the first arm 112 back into the engaged position with the second arm 114. The bag is held open by a combination of the bottom side of the opening wrapped under the base 102 and the sides and top of the opening held by the arm assembly 110.

The user can then cut foodstuff on the preparation surface 108, discarding food scraps by simply pushing them into the bag 170, through the opening formed by the bag extending from the base 102 up through the arm assembly 110. The positioning of the bag provides an opening for food scrap removal, as described in further detail herein, the arm assembly facilitates the opening of the bag, whereby varying techniques are available for how the bag is positioned to or around the arm assembly and relative to the underside of the system 100.

The positioning of the arms 112, 114 and the assembly 110 relative to the base 102 allows for quick and efficient food preparation and waste disposal. Upon completion of the food preparation, the bag 170 can be removed by transitioning the first arm 112 forward as illustrated in FIG. 9 to release the bag. Moreover, the arm assembly 110 can be returned to the storage position following the transitions of FIG. 8 to FIG. 7. This storage position than allows for ease of cleaning and storage.

This food preparation system cures the prior art concerns of complicated structures taking up too much space and not being integrated within the cutting board itself.

The bag itself can be composed of any suitable material, such as plastic, paper, cloth, etc. In one embodiment, the bag can be composed of a biodegradable or compostable material. The user can fill the bag with food scraps and then simply discard the bag either via a trash or by composting. In the example of a cloth bag, the user can then transport the food scraps for later disposal, such as inclusion with a composting pile, and re-use the cloth bag.

The material of the bag can vary, whereby the sizing and dimensions of the bag facilitates being held open by engaging cutting board and the arm assembly 110. In one embodiment, the bag can be held open by a bottom half secured between the cutting board and the countertop, the top half draped over or secured to the arm. As described herein, securing the bag to the arm can be via contacting engagement between arms 112, 114. Other securing means may be utilized, including for example clips, rubber bands, adhesive, or other techniques recognized by one skilled in the art. For example, in the embodiment using a single arm, the top half of the bag can be draped over the arm assembly and held in place by securing means, held open by its natural position, or in another example circumferential tension of the bag opening is tightened by tying or folding bag excess. In another embodiment, the arm assembly may include a loop or hole for pulling the circumferential excess of the bag therethrough.

The present food preparation system includes varying embodiments on the channel and locking mechanism assembly. FIGS. 1-6 illustrate the base 102 having dual channels on opposing sides. The dual channels can also be referred to as a first channel or a left channel and a second channel or a right channel. This inclusion of multiple channels provides structure and rigidity to the arm assembly 110 by including two points of engagement to the base 102, dual channels for movement between the storage position and the extended position, and dual hinging members for transitioning into the extended position and between engaged position and disengaged position.

Moreover, the arm assembly in the extended position can also be in a parallel position relative to the base. Where the above embodiments illustrate the arm assembly rotated to an angular offset from the base, a further embodiment can include the arm assembly extending outward from the base in parallel. In this embodiment, the arm assembly can hang over the edge of a counter, a sink, or other open area. The engagement of the bag in the arm assembly secures the bag in place for collecting food scraps without expressly requiring full rotation of the arm assembly in an upright or angular position.

As noted above, the arm assembly can utilize two varying embodiments, the first embodiment with the first arm and second arm and the second embodiment with a single arm. The single arm may be the first arm 112 (FIG. 5), the second arm 114 (FIG. 6), a fused combination of these arms 112, 114, or a completely separate arm of varying design or shape. The single arm embodiment uses other means to secure the bag thereto, but otherwise operates to hold the bag in an open position for collecting food scraps. As noted above, the single arm may use clips or other means to hold the bag in place.

The food preparation system has physical dimensions consistent with existing cutting board(s) or other food preparation systems. For example, one embodiment can include the base having a dimension of approximately 11.5 inches by 17.5 inches. The thickness or depth of the base can be based on structural rigidity for the channel(s), the interaction with the hinge elements, and the size/weight of the arm assembly. For example, one embodiment can include the base having a thickness of 0.65 inches and the aperture in the channel having a thickness of 0.25 inches.

Similarly, the arms of the arm assembly can have widths corresponding widths of the base, aligning with the end of the base as showing in FIG. 1. Whereas, the length of the arms are adjusted relative to the length of movement within the channel and the height at which the arms extend over the base while in the extended position. For example, one embodiment can include the arms having a width of 11.65 inches for use with a base having the width of 11.5 inches. In one embodiment, the arms can have a length of 5.25 inches.

The above dimensions are illustrative and not limiting in nature. It is recognized that these dimensions are not absolute or restricted dimensions, but rather examples of dimensions for one or more embodiments. As recognized by one skilled in the art, the food preparation system may utilize any variety of dimensions in the base, arm assembly, channel(s), and other elements described herein.

It is recognized that varying embodiments are included herein and the above dual channel is not expressly required. For example, in one embodiment the arm assembly can be arm that is connected on only one side of the base. For example, an arm with a degree of rigidity can extend out and over the base without the other-side connecting to the base. This single point of contact to the base similarly provides both ease of use for collecting food scraps, but also being compact and saving space for storage during non-use.

FIGS. 1 through 10 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation. Such adaptations and modifications are therefore intended to be within the meaning and range of equivalents of the disclosed embodiments.

What is claimed is:

1. A food preparation system comprising:
    a base having a side portion and top portion with a preparation surface for cutting foodstuff thereon;
    an arm assembly including a first arm and is connected to the base;
    a channel disposed within the side portion of the base, the arm assembly connected to the base within the channel, wherein the arm assembly is slidable within the channel, the arm assembly transitioning between a storage position with the arm assembly secured adjacent to the base and an extended position extending outward from the top portion of the base; and
    a locking mechanism for securing the arm assembly in the extended position;
    wherein the arm assembly, when in the extended position, is adjusted for securing a bag between the first arm and a bottom portion of the base;
    wherein the bag, secured between the first arm and the bottom portion of the base, being held in the open position, is positioned for receipt of food scraps from the cutting of foodstuff on the preparation surface.

2. The food preparation system of claim 1 further comprising:
    at least one hinging element connecting the arm assembly to the base such that the arm assembly moving to the extended position includes rotation about the hinging element.

3. The food preparation system of claim 2 further comprising:
    the arm assembly includes the first arm and a second arm, wherein the arm assembly is adjustable between an engaged position with the first arm aligned within the second arm and a disengaged position where the first arm is separated from the second arm; and
    wherein the bag is secured to the arm assembly by moving the first arm and the second arm from the disengaged position to the engaged position and securing the bag therebetween.

4. The food preparation system of claim 3, wherein the movements of the first arm and the second arm between the engaged position and the disengaged position includes rotation about the hinging element.

5. The food preparation system of claim 2, wherein the first arm is composed of a metal and the second arm is composed of a plastic.

6. The food preparation system of claim 5, wherein the second arm includes a tab portion extending outwards and fitting with the handle curvature of the first arm when the arm assembly is in a closed position.

7. The food preparation system of claim 1 further comprising:
    the channel having an interior track and an exterior track, wherein the hinging element includes a first portion secured within the interior track and a second portion secured within the exterior track.

8. The food preparation system of claim 7 wherein interior track and the exterior track provide guidance for sliding the arm assembly within the channel.

9. The food preparation system of claim 1, wherein the arm assembly further comprises:
    the first arm having a handle therein.

10. The food preparation system of claim 1, wherein the locking mechanism is a notch within the side portion of the base.

11. A food preparation system comprising:
    a base having a side portion and top portion with a preparation surface for cutting foodstuff thereon;
    an arm assembly including a first arm and a second arm, the arm assembly connected to the base member, the arm assembly adjustable between an engaged position with the first arm is aligned within the second arm and a disengaged position where the first arm is separated from the second arm;
    a first channel disposed within the side portion of the base, the arm assembly connected to the base within the first channel;
    a second channel disposed within the side portion of the base, opposite to the first channel, the arm assembly connected to the base within the second channel;
    wherein the arm assembly is slidable within the first channel and the second channel, the arm assembly transitioning between a storage position with the arm assembly secured adjacent to the base and an extended position extending outward from the top portion of the base; and
    a locking mechanism for securing the arm assembly in the extended position;
    wherein the arm assembly, when in the extended position, is adjusted from the disengaged position to the engaged position for securing a bag between the first arm and the second arm, the bag additionally engaging a bottom portion of the base to be held in an open position;
    wherein the bag, secured between the first arm and the second arm and held in the open position from engaging the bottom portion, is positioned for receipt of food scraps from the cutting of foodstuff on the preparation surface.

12. The food preparation system of claim 11 further comprising:
    a first hinging element connecting the arm assembly to the base in the first channel; and
    a second hinging element connecting the arm assembly to the base in the second channel;
    such that the arm assembly moving to the extended position includes rotation about the first hinging element and the second hinging element.

13. The food preparation system of claim 12, wherein the movements of the first arm and the second arm between the engaged position and the disengaged position includes rotation about the first hinging element and the second hinging element.

14. The food preparation system of claim 12 further comprising:
   the first channel having a first interior track and a first exterior track, wherein the first hinging element includes a first portion secured within the interior track and a second portion secured within the exterior track.

15. The food preparation system of claim 14 wherein first interior track and the first exterior track provide guidance for sliding the arm assembly within the first channel.

16. The food preparation system of claim 11, wherein the arm assembly further comprises:
   the first arm having a handle therein.

17. The food preparation system of claim 16, wherein the first arm is composed of a metal and the second arm is composed of a plastic.

18. The food preparation system of claim 16, wherein the second arm includes a tab portion extending outwards and fitting with the handle curvature of the first arm when the arm assembly is in a closed position.

19. The food preparation system of claim 11, wherein the locking mechanism is a notch within the side portion of the base.

* * * * *